May 13, 1930.          J. A. ZUBLIN          1,758,875
CUTTER FOR ROTARY BITS
Original Filed Sept. 8, 1925     2 Sheets-Sheet 1
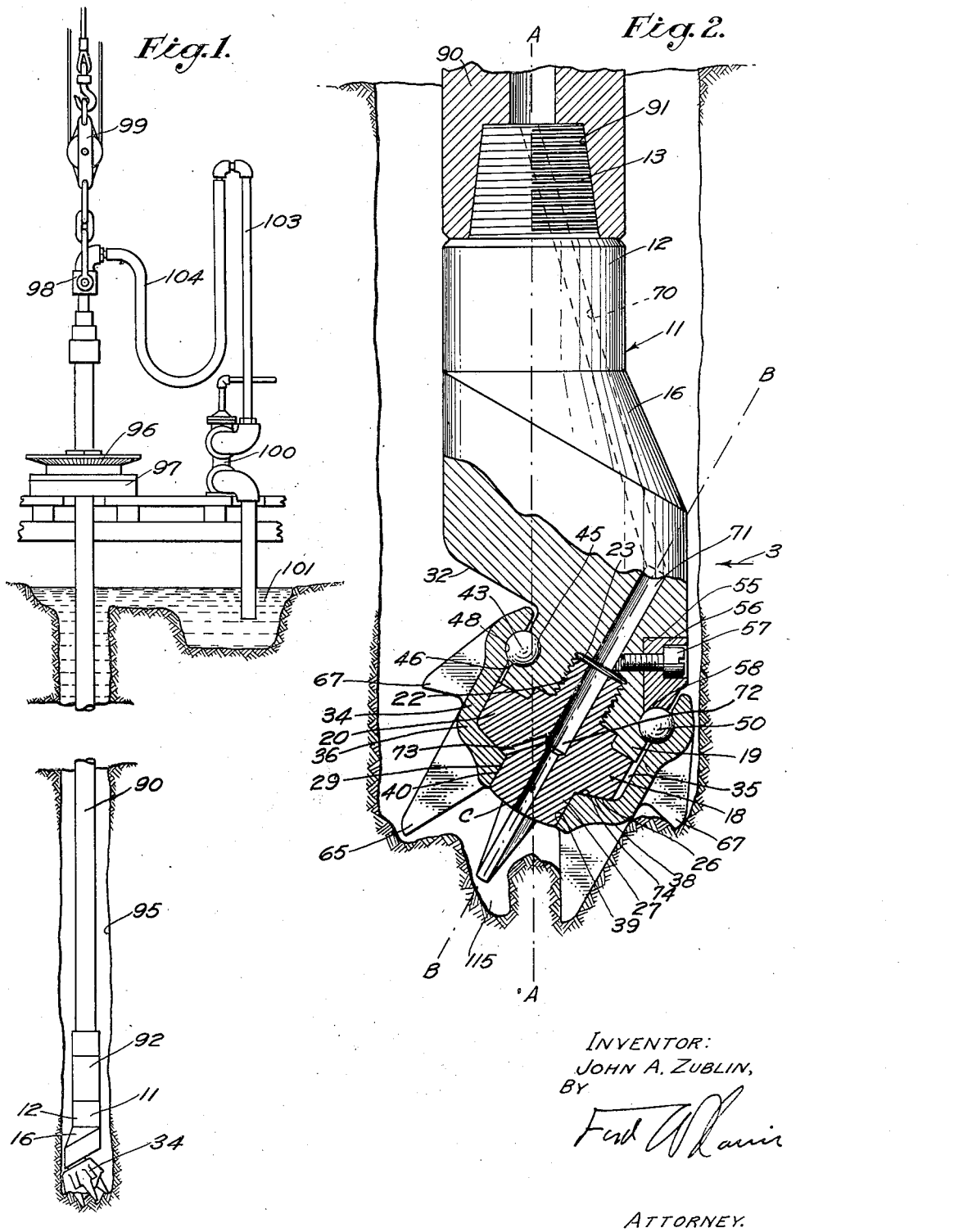

May 13, 1930.  J. A. ZUBLIN  1,758,875
CUTTER FOR ROTARY BITS
Original Filed Sept. 8, 1925  2 Sheets-Sheet 2
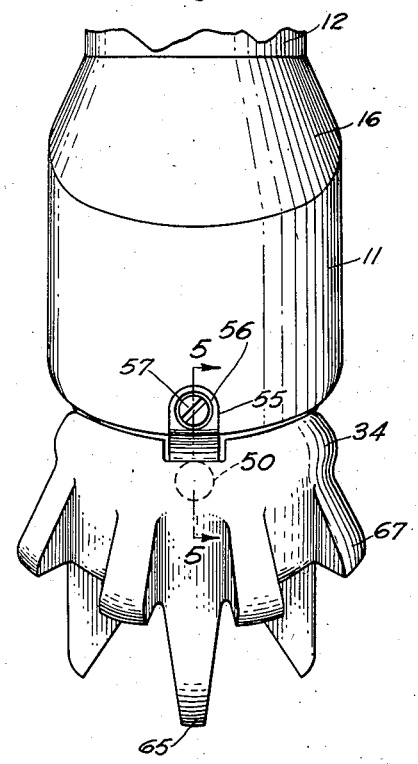
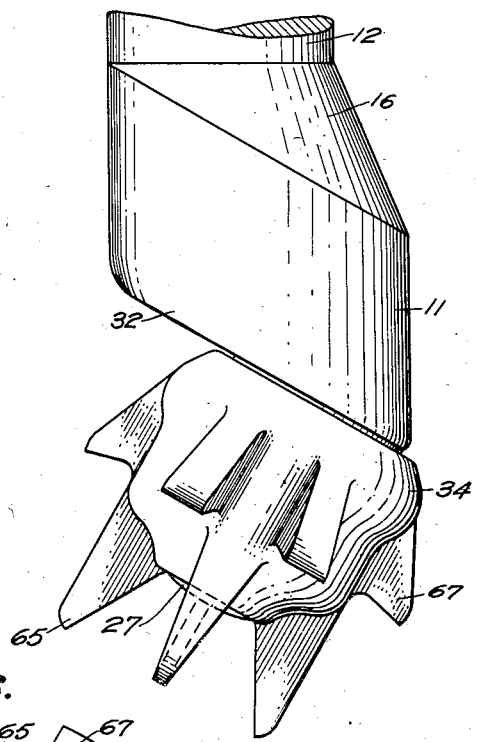
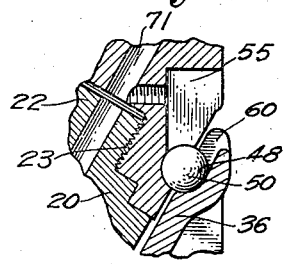
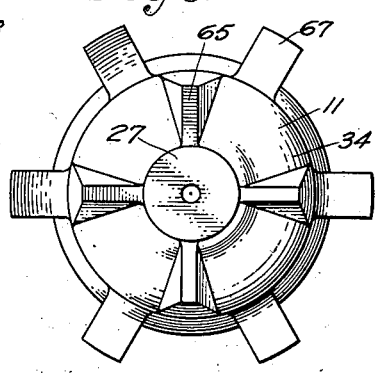
INVENTOR:
JOHN A. ZUBLIN,
BY
ATTORNEY.

Patented May 13, 1930

1,758,875

UNITED STATES PATENT OFFICE

JOHN A. ZUBLIN, OF LOS ANGELES, CALIFORNIA, ASSIGNOR TO UNIVERSAL ENGINEERING COMPANY, OF LOS ANGELES, CALIFORNIA, A CORPORATION OF CALIFORNIA

CUTTER FOR ROTARY BITS

Original application filed September 8, 1925, Serial No. 54,874. Divided and this application filed November 11, 1929. Serial No. 406,237.

This invention relates to bits for drilling wells by the rotary system, and relates particularly to a detachable cutter which may be held on a drill shank and caused to oscillate when the drill shank is rotated. This invention is a division of the subject-matter presented in my application for a rotary bit having reciprocating motion, Serial No. 54,874, filed September 8, 1925.

It is an object of the invention to provide a cutter which may be readily attached to an associated drill shank so as to rotate relative to the drill shank on an inclined axis.

It is a further object of the invention to provide a cutter of this character which will dig or chop cuttings from the formation in which a well is being drilled, this cutter having a combined chopping and scraping action and partaking of the essential features of the old and well-known rotary tools such, for instance, as the fishtail bit by which a scraping action is accomplished, and the percussion or standard type of drill by which cuttings are removed as the result of a pounding or chopping action.

It is a further object of the invention to provide a cutter of this character with securing means so designed that the parts thereof are not exposed to wear and so designed that loss of parts of the bit in the well is practically impossible.

It is a further object of the invention to provide a cutter which will readily and thoroughly mix the cuttings which have been removed from the formation with the rotary drilling fluid so that these cuttings will be readily carried away from the cutting zone in which the cutter operates, this thorough mixing action accomplished by the cutter preventing the cutter from becoming "balled up."

It is a further object of the invention to provide a cutter for a rotary bit, which cutter is so designed that it will operate around the central core formed in the bottom of the hole being drilled.

It is a still further object of the invention to provide a rotary bit which will cut a hole of materially larger diameter than the maximum diameter of the cutter.

Further objects and advantages of the invention will be made evident throughout the following part of the specification and from a consideration of the accompanying drawings which are for illustrative purposes, and in which, Fig. 1 is a somewhat diagrammatic elevational view showing the utility of the invention.

Fig. 2 is an enlarged partly sectioned elevation of a bit having a cutter embodying the present invention secured thereto.

Fig. 3 is an elevational view of the bit and cutter shown in Fig. 1, this view being derived as indicated by the arrow 3 of Fig. 2.

Fig. 4 is a side elevational view of the bit and cutter shown in Fig. 1.

Fig. 5 is an enlarged fragmentary section on a plane represented by the line 5—5 of Fig. 3.

Fig. 6 is a bottom plan view of the cutter.

With particular reference to Figs. 2 to 6 inclusive, I show a bit 11 having a body or shank 12 equipped with a threaded pin 13 at its upper end whereby it may be attached to the lower end of a string of drill pipe. The body 12 rotates on a vertical axis A—A which, as shown in Fig. 2, is the axis of the well and also the axis of the drill shank 12. An eccentric formation 16 is formed at the lower end of the body 12 and from this eccentric formation an inclined pin 18 downwardly extends. The pin 18 is preferably made in two parts so as to consist of an upper part 19 integrally formed with the eccentric formation 16, and the lower part in the form of a separate bearing element 20. The bearing element 20 has a threaded projection 22 which extends into a threaded cavity 23 in the lower portion of the part 19. The bearing element 20 has a lower beveled thrust-bearing face 26 which surrounds the upper end of a central or guide projection 27 which extends downwardly from the separable portion 20 of the pin structure 18. This projection 27 has a cylindrical bearing face 29 which forms a radial bearing. The inclined pin 18 is disposed on an axis B—B, as shown in Fig. 2, this axis B—B being at an angle with the axis of rotation A—A of the body 12. The axes A—A and B—B intersect at a fulcrum point C inside the inclined pin 18. A lower face 32 is formed on the body 12 on a plane perpendicular to the axis B—B of the inclined pin 18.

A cutter 34 embodying the present invention is carried by the inclined pin 18 and has a cavity 35 formed within a cup-shaped wall portion or cup-shaped body 36, this cavity or recess 35 receiving the pin 18 of the shank 12. The thrust-bearing face 26 of the bearing element 20 is engaged by a complementary thrust-bearing face 38 formed at the bottom of the cup portion 36 in a position surrounding an opening 39 in the lower wall of the cup member 36 through which the guide pin 27 of the bearing member 20 extends, the cylindrical bearing face 29 of the projection or pin 27 making radial bearing engagement with a cylindrical journal face 40 defining the opening or bore 39.

At the upper end of the inclined pin 18 and near the upper part of the cup-shaped portion 36 of the cutter 34 there is a radial ball bearing 43 by which the cutter 34 is held in operating position on the pin 18. In the cylindrical face of the upper part 19 of the inclined pin 18 an annular ball race or groove 45 of semi-circular cross-section is provided and on an internal cylindrical wall surface 46 of the cutter 34 a cooperating ball race 48 is provided. Operating in these races 45 and 48 are balls 50 which cooperate with the ball races to form the radial ball bearing 43 which takes all of the side strains exerted by the upper part of the cutter 34 against the upper part of the inclined pin 18 during the operating of the bit and also prevents removal of the cutter 34 from the shank 12.

As shown in Figs. 2, 3, and 5, a recess 55 is formed in the pin 18 adjacent to and communicating with a portion of the ball race 45. This recess 55 receives a plug 56 which may be held in place by a suitable screw 57. The lower end of the plug 56 is arcuated, as indicated at 58 in Fig. 2, and serves as a portion of the inner race 45 when in place. Extending from the race 48 to the upper edge of the cup portion 36, as shown in Fig. 5, is a notch or short channel 60. When the notch 60 is aligned with the recess 55, from which the body 56 has been removed, as shown in Fig. 5, the balls 50 may be inserted in or removed from the races 45 and 48 through the opening provided by such notch 60 and such recess 55. In assembling the cutter 34 on the shank 12, the cup-shaped body portion 34 is placed over the pin 18 and the balls 50 are then placed in the ball races 45 and 48 through the opening formed by the notch 60 and the recess 55. When the races 45 and 48 are in this manner filled with the balls 50, the plug or body 56 is placed in the cavity 55 and is therein secured by means of the screw 57. When this body 56 is in place, as shown in Figs. 2 and 3, it is impossible for balls 50 to pass from the races 45 and 48 through the notch 60 in the cup member 36. When it is desired to remove the cutter from the shank 12, the body 56 is removed from the recess 55 and the balls 50 are then shaken out through the ample opening thereby disclosed. It will be perceived that the radial bearing 43 serves not alone as a bearing but also as a means for retaining the cutter 34 in place on the shank 12. As is obvious from the various views of the drawings, it is impossible to remove the cutter from place when the balls 50 are in the races 45 and 48.

The cutter 34 has prongs 65 which project downwardly from the cup portion 36 and cutting shanks 67 which are preferably of greater width than the prongs 65. In the drawings I have shown the cutter 34 with four prongs 65, but this number of prongs is not necessary to the practice of the invention.

Lubricating fluid, such as rotary mud, gains access to the bearing faces between the cutter 34 and the pin 18 through a passage 70 which extends downwardly through the body 12 and connects with a passage 71 which in turn communicates with the threaded recess 23 at the lower end of the shank 12. The passage 71 communicates with the central opening 72 extending through the bearing member 20, and a branch opening 73 connects between the central part of the opening 72 and the thrust-bearing face 26 of the bearing element 20. Lubricating fluid passing through this branch opening 73 enters a shallow annular groove 74 surrounding the inner or upper end of the projection 27 and is from this annular groove 74 distributed to the thrust-bearing formed by the bearing faces 26 and 38 and the radial-bearing formed by the cylindrical bearing faces 29 and 40. The lubricating fluid being under high pressure is forced outwardly between the various bearing faces and the ball bearing 43 so as to accomplish a thorough lubrication thereof. Lubricating fluid which may be of the ordinary rotary mud passes through the lower end of the opening 72 and supplies lubrication for the cutting prongs 65 and the cutter wings 67, and also serves to carry such cuttings which have been produced by the operation of the members 65 and 67.

For the purpose of further description of my cutter and its utility, reference is made to Figs. 1 and 2 wherein the bit 11, just described, is secured to the lower end of a string of drill pipe 90, the threaded pin 13 of the shank 12 being threaded into a socket 91 of a tool point 92 secured at the lower end of the string of drill pipe 90. This drill pipe 90 extends upwardly through a well 95 and a rotary table 96 of a rotary machine 97, and attached to the upper end of the drill pipe 90 is a swivel head 98 to which a traveling block 99 is connected for raising and lowering and supporting the drill pipe 90. Lubricating fluid is supplied to the bit 11 by a mud pump 100 which draws lubricating fluid from a sump 101 and pumps this lubricating fluid through a stand pipe 103 and a flexible hose 104 into the swivel head 98 which connects with the upper end of the drill pipe 90. The lubricating fluid, as mentioned before, serves to lubricate the bearings of the bit, to wash the plates of the cutter 34, to remove cuttings from the zone of cutting operation, and to support the walls of the hole which has been drilled.

The method of operation of my cutter is most difficult to represent since all portions thereof have a continuous three dimensional movement over curved paths. Theoretically, the fulcrum point C remains stationary during rotation of the bit, but owing to the fact that the long string of drill pipe to which the cutter is attached is elastic in character and since the resistance to motion of the bit may not be uniform, the actual motion of the bit about the axis A—A will not be uniform and the fulcrum point B—B will in most instances travel through an orbit. Assuming, for the purpose of preliminary analysis, that the point C is stationary and that the bit body is rotating at a uniform speed on its axis A—A, it is evident that every point except the point of fulcrum C on the axis B—B will rotate in a circle around the axis A—A. In other words, the axis B—B will gyrate around the axis A—A and the portions thereof above and below the fulcrum point C will describe cones.

The cutter 34 is free to turn on the axis B—B but it is not constrained to do so at any definite rate or according to any definite plan. The cutter being in contact with the walls in the bottom of the hole, its motion is determined by the resultant of the friction between the cutter and these walls. The resultant action of the cutter 34 is one of gyratory oscillation, the cutter swinging with the axis B—B without substantial rotation. It must not be thought, however, that the cutter 34 does not rotate for, during its oscillation, a slow forward rotary movement takes place. At any instance, there is what may be called a frictional center at which point the cutter is stationary and in contact with the hole. This frictional center shifts constantly and in actual service no point in the whole structure except the point of fulcrum C is stationary. As the cutter oscillates and slowly forwardly rotates, the cutting prongs 65 and the cutting wings 67 move downwardly and upwardly through circular paths. This produces a purely digging action by the bit. Each prong as it is forced downwardly digs into the material and dislodges it from the walls of the cavities 115. Each prong in turn is called upon to support substantially the entire pressure which is exerted by the drill pipe on the bottom of the hole, this weight being rapidly shifted from one prong in one cavity to an adjacent prong in an adjacent cavity. This rapid shifting of pressure tends to break the rock along its cleavage lines. It is to be noted that the prongs 65 have substantially the same relation to the cup portion 36 of the cutter that the legs of an ordinary table bear to the top thereof. It may be therefore desired to refer to the prongs 65 as legs extending downwardly from the hub of a rotating cutter. The success of my invention depends in a degree upon the proportion shown in the drawings. It is desirable to use four or five prongs which should preferably have a length of about one-fourth the diameter of the well, this proportionate length allowing the prongs to swing freely in and out of the cavities 115. It is also essential that the point C be well above the base of the prongs so that a desired swinging action of the prongs will be accomplished.

I claim as my invention:

1. In a cutter for use on a bit, the combination of: a cup-shaped portion having a cavity adapted to receive a pin; a thrust-journal face formed on the bottom of said cup-shaped portion, there being a cylindrical opening formed in the bottom of said cup-shaped portion, the wall thereof forming a radial-journal face; and a plurality of prongs extending downward from said cup-shaped portion, said prongs having a length equal to about one-quarter the diameter of the hole to be cut.

2. In a cutter for use on a bit, the combination of: a cup-shaped portion having a cavity adapted to receive a pin; a thrust-journal face formed on the bottom of said cup-shaped portion, there being a cylindrical opening formed in the bottom of said cup-shaped portion, the wall thereof forming a radial-journal face; and a plurality of prongs extending downward from said cup-shaped portion, said prongs being separated by spaces greater than their thickness and being formed about a central recess.

3. In a cutter for use on a bit, the combination of: a cup-shaped portion having a cavity adapted to receive a pin; a thrust-journal face formed on the bottom of said cup-shaped portion, there being a cylindrical opening formed in the bottom of said cup-shaped portion, the wall thereof forming a radial-journal face; a plurality of prongs extending downward from said cup-shaped portion, said prongs having a length equal to about one-quarter the diameter of the hole to be cut; and reaming teeth formed on said cup-shaped portion above said prongs.

4. In a cutter for use on a bit, the combination of: a cup-shaped portion having a cavity adapted to receive a pin; a frusto-conical thrust-journal face formed on the bottom of said cup-shaped portion, there being a cylindrical opening formed in the bottom of said cup-shaped portion below and concentric with thrust-journal face, the wall thereof forming a radial-journal face; and a plurality of prongs extending downward from said cup-shaped portion, said prongs having a length equal to about one-quarter the diameter of the hole to be cut.

5. In a cutter for use on a bit, the combination of: a cup-shaped portion having a cavity adapted to receive a pin; a frusto-conical thrust-journal face formed on the bottom of said cup-shaped portion, there being a cylindrical opening formed in the bottom of said cup-shaped portion below and concentric with said thrust-journal face, the wall thereof forming a radial-journal face; and a plurality of prongs extending downward from said cup-shaped portion, said prongs being separated by spaces greater than their thickness and being formed about a central recess.

6. In a cutter for use on a bit, the combination of: a cup-shaped portion having a cavity adapted to receive a pin; a frusto-conical thrust-journal face formed on the bottom of said cup-shaped portion, there being a cylindrical opening formed in the bottom of said cup-shaped portion below and concentric with said thrust-journal face, the wall thereof forming a radial-journal face; a plurality of prongs extending downward from said cup-shaped portion, said prongs having a length equal to about one-quarter the diameter of the hole to be cut; and reaming teeth formed on said cup-shaped portion above said prongs.

7. In a cutter for use on a bit, the combination of: a cup-shaped portion having a cavity adapted to receive a pin; an annular concave race formed on said cup-shaped portion near the upper part of said cavity; and a plurality of prongs extending downward from said cup-shaped portion, said prongs having a length equal to about one-quarter the diameter of the hole to be cut.

8. In a cutter for use on a bit, the combination of: a cup-shaped portion having a cavity adapted to receive a pin; a thrust-journal face formed on the bottom of said cup-shaped portion, there being a cylindrical opening formed in the bottom of said cup-shaped portion, the wall thereof forming a radial-journal face; an annular concave race formed on said cup-shaped portion near the upper part of said cavity; and a plurality of prongs extending downward from said cup-shaped portion, said prongs having a length equal to about one-quarter the diameter of the hole to be cut.

9. In a cutter for use on a bit, the combination of: a cup-shaped portion having a cavity adapted to receive a pin; a thrust-journal face formed on the bottom of said cup-shaped portion, there being a cylindrical opening formed in the bottom of said cup-shaped portion, the wall thereof forming a radial-journal face; an annular concave race formed on said cup-shaped portion near the upper part of said cavity; and a plurality of prongs extending downward from said cup-shaped portion, said prongs being separated by spaces greater than their thickness and being formed about a central recess.

10. In a cutter for use on a bit, the combination of: a cup-shaped portion having a cavity adapted to receive a pin; a frusto-conical thrust-journal face formed on the bottom of said cup-shaped portion, there being a cylindrical opening formed in the bottom of said cup-shaped portion below and concentric with said thrust-journal face, the wall thereof forming a radial-journal face; an annular concave race formed on said cup-shaped portion near the upper part of said cavity; and a plurality of prongs extending downward from said cup-shaped portion, said prongs having a length equal to about one-quarter the diameter of the hole to be cut.

11. In a cutter for use on a bit, the combination of: a cup-shaped portion having a cavity adapted to receive a pin; a frusto-conical thrust-journal face formed on the bottom of said cup-shaped portion, there being a cylindrical opening formed in the bottom of said cup-shaped portion below and concentric with said thrust-journal face, the wall thereof forming a radial-journal face; an annular concave race formed on said cup-shaped portion near the upper part of said cavity; and a plurality of prongs extending downward from said cup-shaped portion, said prongs being separated by spaces greater than their thickness and being formed about a central recess.

12. In a cutter adapted to be mounted on a rotary drill bit body; a body having means whereby it may be attached to a bit member, bearing means on the cutter body to permit relative rotation between the cutter and the drill bit body, relatively long prongs extending downwardly from said cutter body and defining a central cavity below said body, said prongs being of considerable length as compared with their thickness.

13. In a bit suited for use in rotary well drilling having a body adapted to be rotated about a given axis in a well, and having means on said body for supporting a cutter for rotation on an axis inclined to the axis of rotation of the body, the combination of: a cutter body having means whereby it may be attached to a bit body, relatively long prongs extending downwardly from said body and defining a central cavity below said body, said prongs being relatively few in number and of considerable length compared with their thickness so that each prong practically supports the weight imposed upon the cutter when in downwardmost position.

14. The combination described in claim 13 in which the cutter body is provided with reaming blades extending outwardly therefrom.

In testimony whereof, I have hereunto set my hand at Los Angeles, California, this 5th day of November, 1929.

JOHN A. ZUBLIN.